US010170236B2

(12) United States Patent
Doi

(10) Patent No.: US 10,170,236 B2
(45) Date of Patent: Jan. 1, 2019

(54) COIL UNIT

(71) Applicant: Toyota Jidosha Kabushiki Kaisha, Toyota-shi, Aichi-ken (JP)

(72) Inventor: Taiga Doi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/722,674

(22) Filed: Oct. 2, 2017

(65) Prior Publication Data

US 2018/0137970 A1     May 17, 2018

(30) Foreign Application Priority Data

Nov. 17, 2016   (JP) ................................. 2016-224195

(51) Int. Cl.

| H01F 27/02 | (2006.01) |
| H01F 27/36 | (2006.01) |
| H01F 27/28 | (2006.01) |
| H01F 38/14 | (2006.01) |
| H02J 7/02 | (2016.01) |
| B60L 11/18 | (2006.01) |

(52) U.S. Cl.
CPC .............. *H01F 27/36* (2013.01); *H01F 27/02* (2013.01); *H01F 27/367* (2013.01); *H01F 38/14* (2013.01); *B60L 11/182* (2013.01); *H02J 7/025* (2013.01)

(58) Field of Classification Search
CPC .......... H01F 27/36; H01F 38/14; H01F 27/02; H01F 27/28; H01F 27/24; H01F 27/2804

USPC ................................................. 336/200, 232
See application file for complete search history.

(56) References Cited

U.S. PATENT DOCUMENTS

| 5,216,402 A * | 6/1993 | Carosa | B60L 11/182 336/205 |
| 5,909,099 A * | 6/1999 | Watanabe | A61K 31/726 320/108 |
| 5,917,307 A * | 6/1999 | Watanabe | H01F 38/14 320/108 |
| 6,291,969 B1 * | 9/2001 | Kaneko | H02J 7/0004 320/108 |

(Continued)

FOREIGN PATENT DOCUMENTS

| JP | 2013-110822 A | 6/2013 |
| JP | 2013-126327 A | 6/2013 |

(Continued)

*Primary Examiner* — Tsz Chan
(74) *Attorney, Agent, or Firm* — Dinsmore & Shohl LLP

(57) ABSTRACT

A coil unit includes: a first case; a second case; a ferrite plate; a coil; a shield member; and a seal member. The ferrite plate, the coil and the shield member are arranged inside an accommodation space. The first case includes a first plate portion, a first circumferential wall portion and a first joint face. The second case includes a second plate portion, a second circumferential wall portion, a second joint face, a protruding portion and a through-hole. At least part of a portion at which the first joint face and the second joint face are joined with each other is located closer to the second plate portion than the ferrite plate. An inner periphery of the second case, which defines the through-hole, includes a large-diameter portion and a small-diameter portion respectively provided at both ends. The seal member is arranged inside the large-diameter portion.

4 Claims, 5 Drawing Sheets

(56) References Cited

U.S. PATENT DOCUMENTS

| | | | |
|---|---|---|---|
| 2012/0218068 A1* | 8/2012 | Yamakawa | H01Q 1/3225 336/90 |
| 2012/0319647 A1* | 12/2012 | Itabashi | H02M 3/33553 320/108 |
| 2013/0127409 A1 | 5/2013 | Ichikawa | |
| 2013/0193749 A1 | 8/2013 | Nakamura et al. | |
| 2015/0008877 A1 | 1/2015 | Ichikawa et al. | |
| 2015/0303735 A1* | 10/2015 | Kari | H01F 38/14 320/108 |
| 2015/0367739 A1* | 12/2015 | Boser | H01F 38/14 320/108 |
| 2016/0352153 A1* | 12/2016 | Nakahara | H02J 7/025 |

FOREIGN PATENT DOCUMENTS

| | | |
|---|---|---|
| JP | 2013-146148 A | 7/2013 |
| JP | 2013-146154 A | 7/2013 |
| JP | 2013-154815 A | 8/2013 |
| JP | 2016-103589 A | 6/2016 |
| WO | 2016/083884 A1 | 6/2016 |

\* cited by examiner

COIL UNIT

CROSS-REFERENCE TO RELATED APPLICATIONS

This application claims priority to Japanese Patent Application No. 2016-224195 filed on Nov. 17, 2016 which is incorporated herein by reference in its entirety including the specification, drawings and abstract.

BACKGROUND

1. Technical Field

This disclosure relates to a coil unit including a ferrite plate and a coil and, more particularly, to a coil unit that is used in a contactless charging system.

2. Description of Related Art

Various contactless charging systems have been conventionally suggested (Japanese Patent Application Publication No. 2013-154815 (JP 2013-154815 A), Japanese Patent Application Publication No. 2013-146154 (JP 2013-146154 A), Japanese Patent Application Publication No. 2013-146148 (JP 2013-146148 A), Japanese Patent Application Publication No. 2013-110822 (JP 2013-110822 A), Japanese Patent Application Publication No. 2013-126327 (JP 2013-126327 A)). A document that describes an existing coil unit is, for example, Japanese Patent Application Publication No. 2016-103589 (JP 2016-103589 A).

In a power receiving device and a power transmitting device described in JP 2016-103589 A, a shield member that blocks electromagnetic waves that are generated by a coil has a step such that the step is arranged away from a ferrite plate. Thus, the outer peripheral side of the ferrite plate is exposed to the space inside the coil unit, so it is possible to induce magnetic fluxes from the exposed outer peripheral side of the ferrite plate into the ferrite plate. As a result, linkage of magnetic fluxes from the coil with the shield member is suppressed, so it is possible to reduce eddy current loss.

SUMMARY

Incidentally, in the coil unit, an accommodation case has a through-hole in order to take a wiring member out of the accommodation case that accommodates the coil, and the like. The accommodation case is formed of a box-shaped case body (second case) and a resin lid (first case). The case body is open toward one side. The resin lid seals the opening of the case body. The through-hole is provided in a circumferential wall portion of the case body.

Generally, the case body is formed by casting a material that blocks magnetic fluxes, typically, aluminum, an aluminum alloy, or the like. The case body has a joint face at the distal end of the circumferential wall portion. The joint face is mated with the resin lid. The joint face is ground in order to ensure the sealability of the inside of the accommodation case. A grommet is inserted in the through-hole as a seal member. In order to ensure sealability between the grommet and the inner periphery of the case body, which defines the through-hole, the inner periphery of the case body is also ground.

For this reason, when the joint face and a grommet insertion portion are provided so as to overlap with each other in the thickness direction of the case body, the case body is ground from both the inner peripheral side and joint face side of the case body. Thus, it is required to ensure an appreciable extent of the thickness of the circumferential wall portion of the case body. In such a case, the circumferential wall portion of the case body covers the side of the ferrite plate, so magnetic fluxes that try to enter the ferrite plate from the side of the ferrite plate are blocked by the circumferential wall portion.

The disclosure provides a coil unit that allows a wiring member to be taken out while suppressing a reduction in magnetic fluxes that are input to a ferrite plate.

A coil unit according to the disclosure includes: a first case; a second case; a ferrite plate, a coil, a shield member, and a seal member. The first case and the second case face each other in a predetermined direction, and define an accommodation space inside when joined with each other. The ferrite plate, the coil and the shield member are arranged in the accommodation space. The seal member is attached to the second case for taking a wiring member outside from an inside of the accommodation space. The wiring member is electrically connected to the coil. The first case includes a first plate portion, a first circumferential wall portion provided so as to be upright from a periphery of the first plate portion, and a first joint face located at a distal end of the first circumferential wall portion in a direction in which the first circumferential wall portion is upright, and allows magnetic fluxes to pass therethrough. The second case includes a second plate portion arranged to face the first plate portion, a second circumferential wall portion provided so as to be upright from a periphery of the second plate portion, and a second joint face located at a distal end of the second circumferential wall portion in a direction in which the second circumferential wall portion is upright, and blocks magnetic fluxes. The first case and the second case define the accommodation space when the first joint face and the second joint face are joined with each other. The ferrite plate is arranged in the accommodation space such that a thickness direction of the ferrite plate is parallel to the predetermined direction. The coil is arranged between the first plate portion and the ferrite plate such that a winding axis of the coil is parallel to the predetermined direction. The shield member is arranged between the second plate portion and the ferrite plate so as to support the ferrite plate. At least part of a portion at which the first joint face and the second joint face are joined with each other is located closer to the second plate portion than a position of the ferrite plate in a direction parallel to the predetermined direction. The second case further includes a protruding portion and a through-hole. The protruding portion protrudes outward from a position of the second circumferential wall portion when viewed in the direction parallel to the predetermined direction. The through-hole extends through the protruding portion and the second circumferential wall portion so as to communicate with the accommodation space. The wiring member and the seal member are arranged inside the through-hole. An inner periphery of the second case, which defines the through-hole, includes a large-diameter portion and a small-diameter portion. The large-diameter portion is provided at an end opposite from a side on which the accommodation space is located and at a position that does not overlap with the second joint face when viewed in the direction parallel to the predetermined direction. The small-diameter portion connects the large-diameter portion with the accommodation space. The small-diameter portion is smaller in inside diameter than the large-diameter portion. The seal member is arranged inside the large-diameter portion.

The coil unit having the above configuration includes the protruding portion that protrudes outward from the second circumferential wall portion of the second case when viewed in a direction in which the first case and the second case face each other (predetermined direction). By providing the through-hole such that the through-hole extends through the protruding portion and the second circumferential wall portion and arranging the seal member in the through-hole for taking a wiring member outside, it is possible to take the wiring member outside from the inside of the first case and second case through the through-hole and the seal member.

The large-diameter portion at which the seal member is arranged in the through-hole is provided at one end of the protruding portion, located on a side opposite from a side on which the accommodation space is located and at a position that does not overlap with a portion at which the first joint face of the first case and the second joint face of the second case are joined with each other.

The large-diameter portion is formed by providing the second case with a hole that extends through the protruding portion and the second circumferential wall portion and grinding the inner periphery of the second case, which defines the hole. On the other hand, the second joint face is also formed by grinding the end face located at the distal end of the second circumferential wall portion.

As described above, since the large-diameter portion and the second joint face are provided so as not to overlap with each other when viewed in the predetermined direction, it is possible to avoid grinding the same point of the second case from both the inner peripheral side and outer peripheral side of the second case, and it is possible to grind the second case from any one of the inner peripheral side and outer peripheral side of the second case.

Generally, a void can be formed inside the second case in processes during manufacturing. When the second case is ground from both the inner side and outer side of the second case, the second joint face and the large-diameter portion can be connected by the void. In the coil unit according to the disclosure, the second case is ground from any one of the inner side and outer side of the second case as described above. For this reason, if a desired thickness is ensured for a void on a side opposite from a grinding side in the second case, the side opposite from the grinding side does not connect with the void even when the grinding side has reached the void. Thus, it is possible to reduce the thickness of the second case at a portion at which the second joint face is located. As a result, at least part of the portion at which the first joint face and the second joint face are joined with each other is located closer to the second plate portion than the position of the ferrite plate in the direction parallel to the predetermined direction in which the first case and the second case face each other.

Thus, the side of the ferrite plate, which corresponds to at least part of the portion at which the first joint face and the second joint face are joined with each other, is covered with not the second circumferential wall portion that blocks magnetic fluxes but the first circumferential wall portion that allows magnetic fluxes to pass therethrough. For this reason, it is possible to input magnetic fluxes, which have passed through the first circumferential wall portion, into the ferrite plate, and it is possible to suppress a reduction in magnetic fluxes that are input to the ferrite plate.

As described above, the coil unit is able to take a wiring member outside while suppressing a reduction in magnetic fluxes that are input to the ferrite plate.

In the coil unit according to the above disclosure, all the portion at which the first joint face and the second joint face are joined with each other may be located closer to the second plate portion than the position of the ferrite plate in the direction parallel to the predetermined direction.

With the above configuration, the side of the ferrite plate, which corresponds to all the portion at which the first joint face and the second joint face are joined with each other, is covered with not the second circumferential wall portion that blocks magnetic fluxes but the first circumferential wall portion that allows magnetic fluxes to pass therethrough. As a result, it is possible to input a further larger amount of magnetic fluxes to the ferrite plate, and it is possible to suppress a reduction in magnetic fluxes that are input to the ferrite plate.

In the coil unit according to the above disclosure, the protruding portion may include a first cylindrical portion and a second cylindrical portion, the second cylindrical portion may be located on an outer side of the first cylindrical portion when viewed in the predetermined direction, the second cylindrical portion may be larger in outside diameter than the first cylindrical portion. In this case, part of an outer periphery of the first cylindrical portion, which is connected with the second joint face, may be flush with the second joint face and may be located closer to the second plate portion than part of an outer periphery of the second cylindrical portion, which is connected with the part of the outer periphery of the first cylindrical portion, and the second cylindrical portion may have the large-diameter portion inside.

As described above, when part of the outer periphery of the first cylindrical portion, which is connected with the second joint face, is flush with the second joint face, it is possible to ensure a wider space on the outer side of the portion at which the first joint face and the second joint face are connected with each other. Thus, it is possible to input magnetic fluxes, passing through the space and the first circumferential wall portion, to the side of the ferrite plate. As a result, it is possible to increase magnetic fluxes that are input to the ferrite plate.

In the coil unit according to the above disclosure, the inner periphery of the second case, which defines the small-diameter portion, may have a tapered portion of which a circumference increases from a side of the accommodation space toward an outer side of the second case.

With the above configuration, it is possible to increase the thickness of the second case around the through-hole at the position corresponding to the second joint face. When a load is exerted on the first case side due to a collision object, or the like, the load is transmitted to the second circumferential wall portion of the second case via a joint portion at which the first joint face and the second joint face are joined with each other. By increasing the thickness of the second case around the through-hole as described above, it is possible to improve the strength of the second case. Thus, it is possible to improve impact resistance.

According to the disclosure, it is possible to provide a coil unit that allows a wiring member to be taken out while suppressing a reduction in magnetic fluxes that are input to a ferrite plate.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
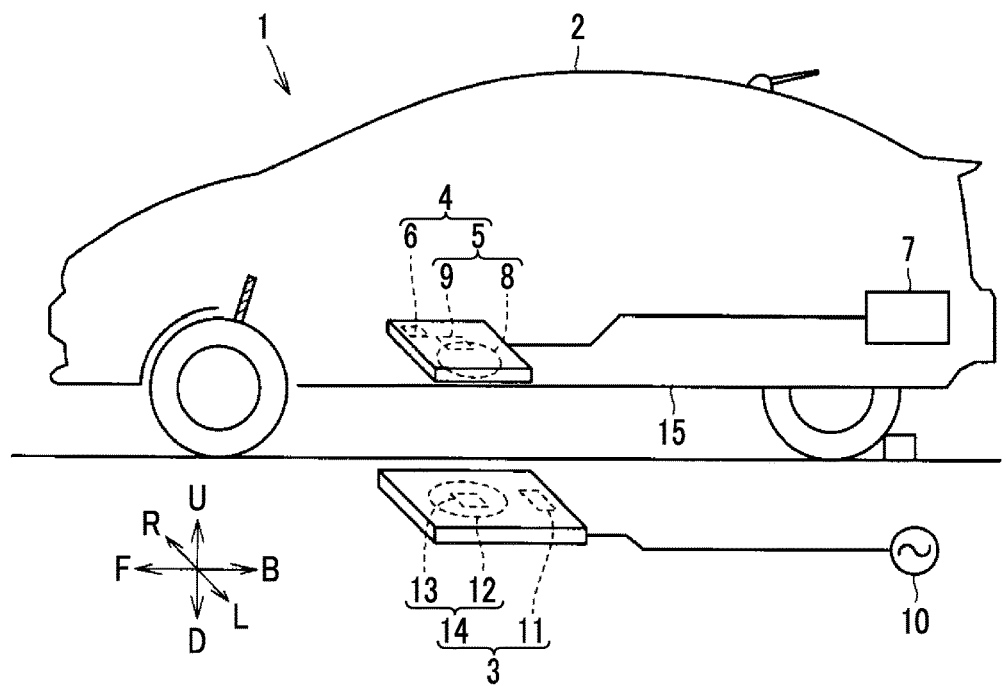
FIG. 1 is a schematic view that shows a contactless charging system according to an embodiment.

Hereinafter, an embodiment of the disclosure will be described in detail with reference to the accompanying drawings. In the embodiment that will be described below, like reference numerals denote the same or common portions in the drawings, and the description thereof is not repeated.

Figure 2:
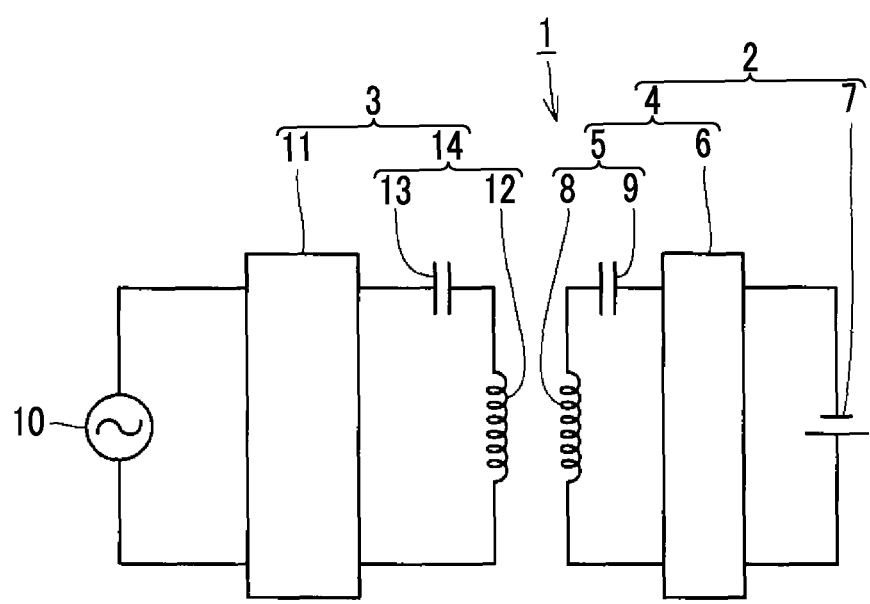
FIG. 2 is an electric circuit that shows the contactless charging system according to the embodiment.

FIG. 1 is a schematic view that shows a contactless charging system according to the embodiment. FIG. 2 is an electric circuit that shows the contactless charging system according to the embodiment. The contactless charging system 1 according to the embodiment will be described with reference to FIG. 1 and FIG. 2.

As shown in FIG. 1, the arrow U indicates a direction opposite to a gravity direction, and the arrow D indicates the gravity direction. The arrows R, L indicate the vehicle width direction of a vehicle 2. The arrows F, B indicate the vehicle longitudinal direction of the vehicle 2. The meanings of these arrows are common among FIG. 3 to FIG. 5.

As shown in FIG. 1 and FIG. 2, the contactless charging system 1 includes the vehicle 2 and a coil unit 3. The coil unit 3 serves as a power transmitting device. A coil unit 4 and a battery 7 are mounted on the vehicle 2. The coil unit 4 serves as a power receiving device. The coil unit 4 is provided on the lower face of a floor panel 15 of the vehicle 2. The coil unit 3 is provided on the ground outside of the vehicle 2. The coil unit 4 contactlessly receives electric power from the coil unit 3.

The coil unit 4 includes a resonator 5 and a rectifier 6. The resonator 5 includes a power receiving coil 8 and a capacitor 9. The power receiving coil 8 and the capacitor 9 constitute an LC resonance circuit. The rectifier 6 is connected to the resonator 5. The rectifier 6 converts alternating-current power, received by the resonator 5, to direct-current power and supplies the direct-current power to the battery 7.

The coil unit 3 includes a resonator 14 and a converter 11. The resonator 14 includes a power transmitting coil 12 and a capacitor 13. The power transmitting coil 12 and the capacitor 13 constitute an LC resonance circuit. The converter 11 is connected to a power supply 10. The converter 11 adjusts the frequency of alternating current that is supplied from the power supply 10, adjusts the voltage and supplies the electric power to the resonator 14.

Figure 3:
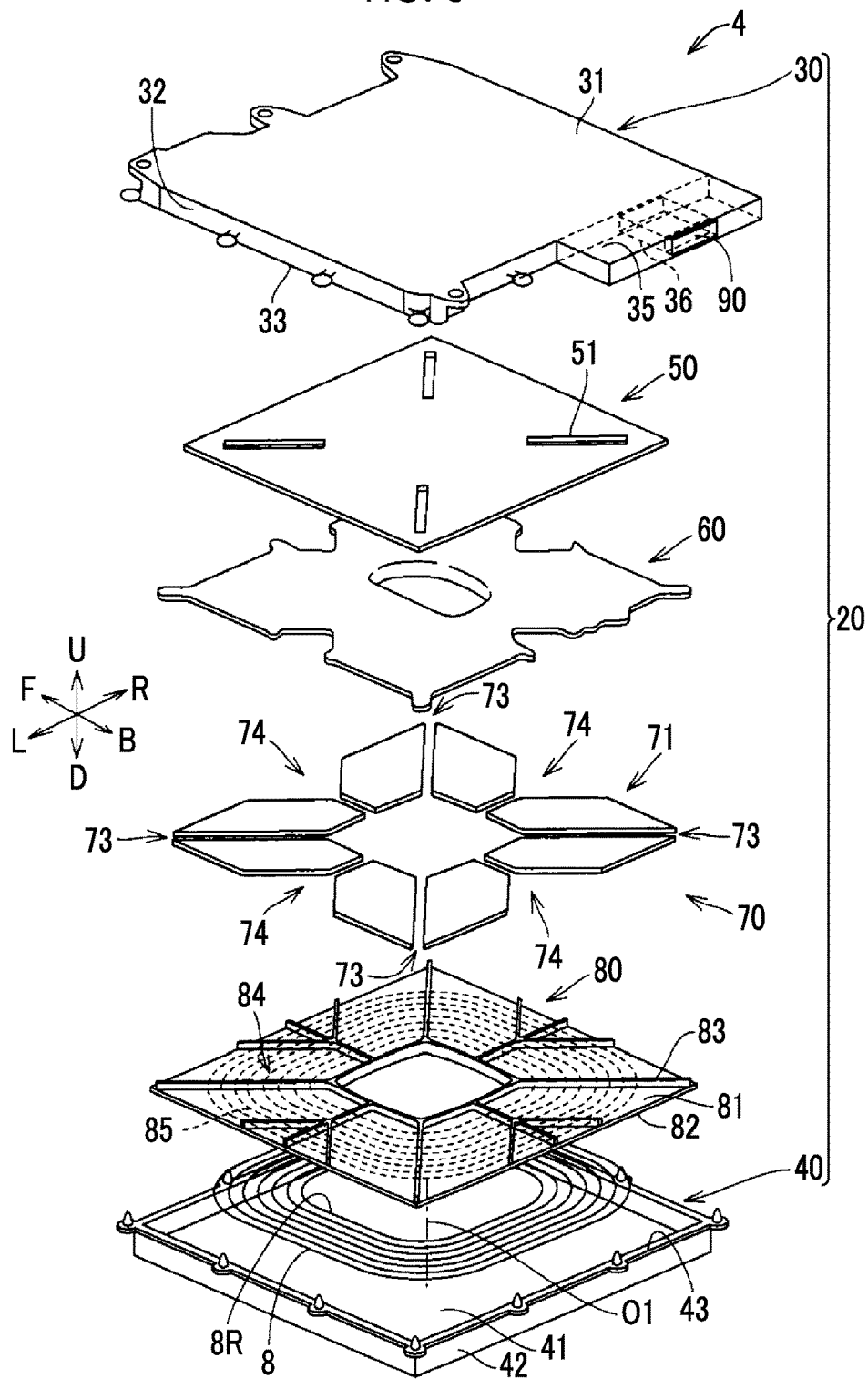
FIG. 3 is an exploded perspective view that shows a coil unit according to the embodiment.

FIG. 3 is an exploded perspective view that shows the coil unit according to the embodiment. The coil unit 4 according to the embodiment will be described with reference to FIG. 3.

As shown in FIG. 3, the coil unit 4 includes an accommodation case 20, the power receiving coil 8, a bobbin 80, a ferrite plate 70, a shield member 60, a base plate 50 and a seal member 90. The accommodation case 20 includes a first case 40 and a second case 30. The first case 40 and the second case 30, for example, face each other in the vertical direction of the vehicle and are joined with each other to define an accommodation space inside. The power receiving coil 8, the bobbin 80, the ferrite plate 70, the shield member 60 and the base plate 50 are accommodated in the accommodation space.

The second case 30 is a member that is fixed to the lower face, or the like, of the floor panel 15 (FIG. 1) by a plurality of bolts (not shown). The second case 30 is made of, for example, aluminum or an aluminum alloy.

The second case 30 has such a box shape that the second case 30 opens toward the first case 40. The second case 30 includes a second plate portion 31, a second circumferential wall portion 32, a second joint face 33 and a plurality of support walls 37 (see FIG. 4). The second case 30 further includes a protruding portion 35 and a through-hole 36.

The second plate portion 31 has a substantially flat plate shape. The plurality of support walls 37 protrude toward the first case 40 from the principal face of the second plate portion 31, facing the first case 40. The plurality of support walls 37 extend through the base plate 50 and support the shield member 60. The second circumferential wall portion 32 is provided so as to be upright from the periphery of the second plate portion 31. The second joint face 33 is provided at the distal end of the second circumferential wall portion 32 in the direction in which the second circumferential wall portion 32 is upright. The second joint face 33 is flush over all the portion in the circumferential direction.

The protruding portion 35 protrudes outward from the position of the second circumferential wall portion 32 when viewed in the direction in which the second case 30 and the first case 40 face each other. The protruding portion 35, for example, protrudes rearward of the vehicle from a portion of the second circumferential wall portion 32, which is located at the rear side of the vehicle.

The through-hole 36 is provided so as to extend through the protruding portion 35 and the second circumferential wall portion 32. The details of the through-hole 36 will be described later with reference to FIG. 4.

The seal member 90 is arranged at one end of the through-hole 36, which is located on the opposite side from the accommodation space inside the first case 40 and the second case 30. The seal member 90 is configured to allow a wiring member to be inserted therein while sealing the through-hole 36. The wiring member is electrically connected to the power receiving coil 8. For example, a grommet, or the like, may be employed as the seal member 90.

The first case 40 has a box shape that opens toward the second case 30. The first case 40 covers the second case 30 from the lower side. The first case 40 includes a first plate portion 41, a first circumferential wall portion 42 and a first joint face 43.

The first plate portion 41 has a substantially flat plate shape. The first plate portion 41 is arranged so as to face the second plate portion 31. The first circumferential wall portion 42 is provided so as to be upright from the periphery of the first plate portion 41. The first joint face 43 is provided at the distal end of the first circumferential wall portion 42 in the direction in which the first circumferential wall portion 42 is upright. The first joint face 43 is flush over all the portion in the circumferential direction.

The first case 40 and the second case 30 define an accommodation space inside when the first joint face 43 and the second joint face 33 are joined with each other.

The base plate 50 is arranged between the second plate portion 31 of the second case 30 and the shield member 60. Electrical elements that perform electric power conversion, low-voltage control, or the like, such as the capacitor 9 and the rectifier 6, are implemented on the surface of the base plate 50. The base plate 50 has slits 51. The support walls 37 (see FIG. 4) provided in the second case 30 extend through the slits 51.

The ferrite plate 70 is accommodated in the accommodation space such that the thickness direction of the ferrite plate 70 is parallel to the direction in which the first case 40 and the second case 30 face each other. The ferrite plate 70 is arranged between the power receiving coil 8 and the shield member 60. The ferrite plate 70 is supported by the shield member 60. The ferrite plate 70 has a hollow portion at its center. The ferrite plate 70 has a plurality of corners 73. Each side of the ferrite plate 70, located between any adjacent corners 73, has a cutout portion 74.

The ferrite plate 70 includes a plurality of split ferrites 71. The plurality of split ferrites 71 are radially arranged so as to surround the hollow portion. Any adjacent split ferrites 71 are arranged via a gap.

The shield member 60 is arranged between the second plate portion 31 and the ferrite plate 70. The shield member 60 supports the ferrite plate 70. The center of the shield member 60 protrudes toward a side opposite to a side on which the base plate 50 is located. The shield member 60 is made of, for example, aluminum or an aluminum alloy.

The bobbin 80 has mutually facing principal faces 81, 82. The principal face 81 faces toward the shield member 60. Ribs 83 are provided on the principal face 81. The ribs 83 partition accommodating portions 84 for respectively accommodating the plurality of split ferrites 71. Thus, the bobbin 80 covers the plurality of split ferrites 71 from the side opposite from the side on which the base plate 50 is located with respect to the shield member 60.

The principal face 82 faces toward the first plate portion 41 of the first case 40. The principal face 82 has a coil groove 85 for accommodating the power receiving coil 8.

The power receiving coil 8 is arranged in the accommodation space such that the winding axis O1 of the power receiving coil 8 is parallel to the direction in which the first case 40 and the second case 30 face each other. The power receiving coil 8 is arranged in the coil groove 85.

The power receiving coil 8 is formed in an annular shape so as to surround the winding axis O1. In the example shown in FIG. 3, the winding axis O1 extends in the vertical direction. The power receiving coil 8 is a so-called spiral coil. The power receiving coil 8 has an opening 8R at its center.

Figure 4:
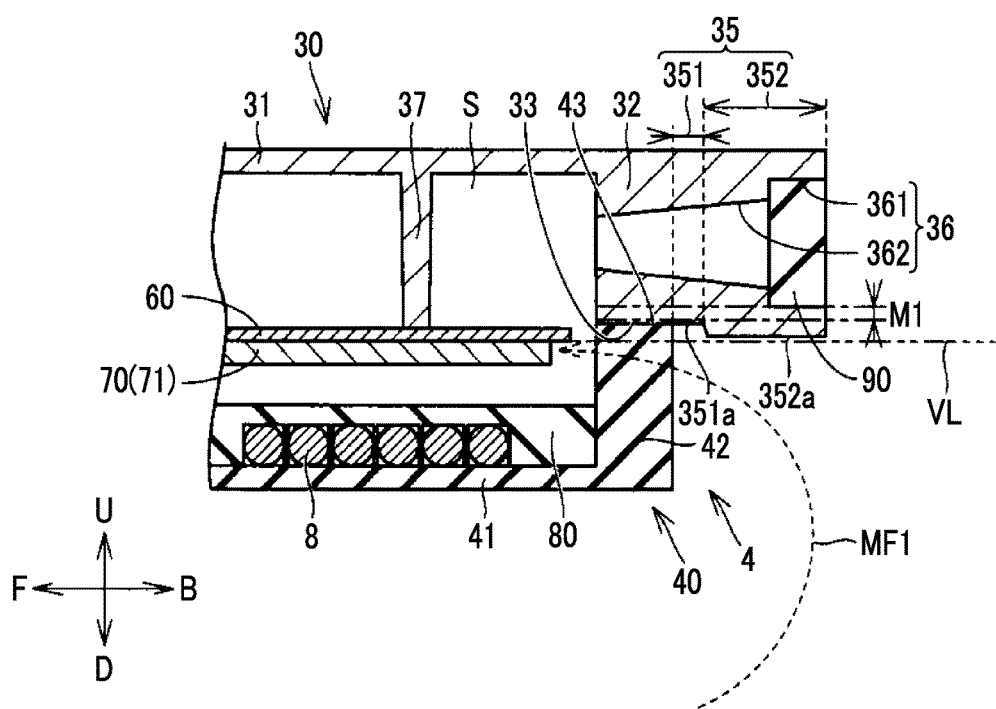
FIG. 4 is a cross-sectional view that shows a structure around a through-hole through which a wiring member passes in the coil unit according to the embodiment.

FIG. 4 is a cross-sectional view that shows a structure around the through-hole through which the wiring member passes in the coil unit according to the embodiment. The structure around the through-hole through which the wiring member passes will be described with reference to FIG. 4.

As shown in FIG. 4, as described above, when viewed in the direction in which the first case 40 and the second case 30 face each other, the coil unit 4 has the protruding portion 35 that protrudes outward from the second circumferential wall portion 32, and has the through-hole 36 that extends through the protruding portion 35 and the second circumferential wall portion 32.

The inner periphery of the second case 30, which defines the through-hole 36, has a large-diameter portion 361 and a small-diameter portion 362. When viewed in the direction in which the first case 40 and the second case 30 face each other, the large-diameter portion 361 is provided at one end of the protruding portion 35, opposite from the side on which the accommodation space S is located and at a position that does not overlap with the second joint face 33. The small-diameter portion 362 connects the large-diameter portion 361 with the accommodation space S, and is smaller in inside diameter than the large-diameter portion 361.

The wiring member (not shown) electrically connected to the power receiving coil 8 is inserted through the through-hole 36. The above-described seal member 90 is arranged inside the large-diameter portion 361. The wiring member is pulled out through the opening (not shown) of the seal member 90.

The protruding portion 35 includes a first cylindrical portion 351 and a second cylindrical portion 352. The first cylindrical portion 351 is connected with the second circumferential wall portion 32 such that the inside of the first cylindrical portion 351 communicates with the accommodation space. When viewed in the direction in which the first case 40 and the second case 30 are arranged, the second cylindrical portion 352 is located on the outer side of the first cylindrical portion 351.

Part of the outer periphery of the first cylindrical portion 351, which is connected with the second joint face 33, is flush with the second joint face 33, and is located closer to the second plate portion 31 than part of the outer periphery of the second cylindrical portion 352, which is connected with the part of the outer periphery of the first cylindrical portion 351.

Part of the outer periphery of the second cylindrical portion 352, which is connected with the part of the outer periphery of the first cylindrical portion 351, is located closer to the second plate portion 31 than the position of the ferrite plate 70 in the direction parallel to the direction in which the first case 40 and the second case 30 face each other.

A portion at which the second joint face 33 of the second case 30 and the first joint face 43 of the first case 40 are joined with each other is located closer to the second plate portion 31 than the position of the ferrite plate 70 in the direction in which the first case 40 and the second case 30 face each other. Specifically, a portion at which the second joint face 33 and the first joint face 43 are joined with each other is located above the position VL of the principal face of the ferrite plate 70, facing the second plate portion 31.

In the contactless charging system 1, at the time when electric power is supplied from the coil unit 3 to the coil unit 4, alternating-current power is supplied to the power transmitting coil 12, and a large amount of magnetic fluxes are formed around the power transmitting coil 12. When part of the magnetic fluxes link with the power receiving coil 8, induced electromotive force is generated in the power receiving coil 8. Thus, alternating current also flows through the power receiving coil 8, and alternating-current power is supplied from the power transmitting coil 12 to the power receiving coil 8. For this reason, many of magnetic fluxes generated by the power transmitting coil 12 are desirably captured by the ferrite plate 70.

As described above, when viewed in a predetermined direction in which the first case 40 and the second case 30 are arranged to face each other, the coil unit 4 according to the present embodiment includes the protruding portion 35 that protrudes outward from the second circumferential wall portion 32 of the second case 30. The coil unit 4 includes the through-hole 36 that extends through the protruding portion 35 and the second circumferential wall portion 32.

The large-diameter portion 361 at which the seal member 90 is arranged in the through-hole 36 is provided at one end of the protruding portion 35, which is located opposite from the side on which the accommodation space S is located and at a position that does not overlap with a portion at which the first joint face 43 of the first case 40 and the second joint face 33 of the second case 30 are joined with each other.

The large-diameter portion 361 is formed by providing the second case 30 with a hole that extends through the protruding portion 35 and the second circumferential wall portion 32 and grinding the inner periphery of the second case 30, which defines the hole. On the other hand, the second joint face 33 is also formed by grinding an end face located at the distal end of the second circumferential wall portion 32.

Since the large-diameter portion 361 and the second joint face 33 are provided so as not to overlap with each other when viewed in the direction in which the first case 40 and the second case 30 face each other, it is possible to avoid grinding of the same point of the second case 30 from both the inner peripheral side and outer peripheral side of the second case 30, and it is possible to grind the second case 30 from any one of the inner peripheral side and outer peripheral side of the second case 30.

The second case 30 is formed by casting a material that blocks magnetic fluxes, typically, aluminum, an aluminum alloy, or the like. Depending on the condition of casting, a void can be formed in the second case 30.

When the second case 30 is ground from both the inner side and outer side of the second case 30, the second joint face 33 and a large-diameter portion can be connected by the void. However, in the coil unit 4 according to the disclosure, the second case 30 is ground from any one of the inner side and outer side of the second case 30 as described above.

For this reason, if a desired thickness M1 is ensured for a void on the side opposite from the grinding side, the side opposite from the grinding side does not connect with the void even when the grinding side has reached the void. Thus, it is possible to reduce the thickness of the second case 30 at a portion at which the second joint face 33 is located. As a result, all the portion at which the first joint face 43 and the second joint face 33 are joined with each other is located closer to the second plate portion than the position of the ferrite plate 70 in the direction parallel to the predetermined direction in which the first case 40 and the second case 30 face each other.

Thus, the side of the ferrite plate 70, which corresponds to all the portion at which the first joint face 43 and the second joint face 33 are joined with each other is covered with not the second circumferential wall portion 32 that blocks magnetic fluxes but the first circumferential wall portion 42 that allows magnetic fluxes to pass therethrough. For this reason, it is possible to input magnetic fluxes, which have passed through the first circumferential wall portion 42, into the ferrite plate 70, and it is possible to suppress a reduction in magnetic fluxes that are input to the ferrite plate 70.

In the coil unit 4, a part 351a of the outer periphery of the first cylindrical portion 351, which is connected with the second joint face 33, is flush with the second joint face 33, and is located closer to the second plate portion 31 than a part 352a of the outer periphery of the second cylindrical portion 352, which is connected with the part 351a of the outer periphery of the first cylindrical portion 351. The second cylindrical portion 352 has the large-diameter portion 361 inside.

Thus, it is possible to ensure a wider space on the outer side of the portion at which the first joint face 43 and the second joint face 33 are connected to each other, and it is possible to input magnetic fluxes, passing through the space and the first circumferential wall portion 42, to the side of the ferrite plate 70. As a result, it is possible to increase magnetic fluxes that are input to the ferrite plate 70.

Furthermore, in the coil unit 4, the inner periphery of the second case 30, which defines the small-diameter portion 362, has such a tapered portion that the circumference increases from the accommodation space S side toward the outer side of the second case 30.

Thus, it is possible to increase the thickness of the second case 30 around the through-hole 36 at the position corresponding to the second joint face 33. When a load is exerted on the first case 40 side due to a collision object, or the like, the load is transmitted to the second circumferential wall portion 32 of the second case 30 via a joint portion at which the first joint face 43 and the second joint face 33 are joined with each other. By increasing the thickness of the second case 30 around the through-hole 36, it is possible to improve the strength of the second case 30. Thus, it is possible to improve impact resistance.

It is possible to take the wiring member outside from the inside of the first case 40 and second case 30 through the through-hole 36 and the seal member 90.

As described above, the coil unit 4 allows the wiring member to be taken out while suppressing a reduction in magnetic fluxes that are input to the ferrite plate 70.

The coil unit 3 that serves as the power transmitting device has substantially a similar configuration to the configuration obtained by inverting the coil unit 4 (described later) vertically, so the technical idea associated with the coil unit 4 is, of course, applicable to the coil unit 3. Thus, the coil unit 3, as well as the coil unit 4, allows the wiring member to be taken out while suppressing a reduction in magnetic fluxes that are input to the ferrite plate 70.

Comparative Embodiment

Figure 5:
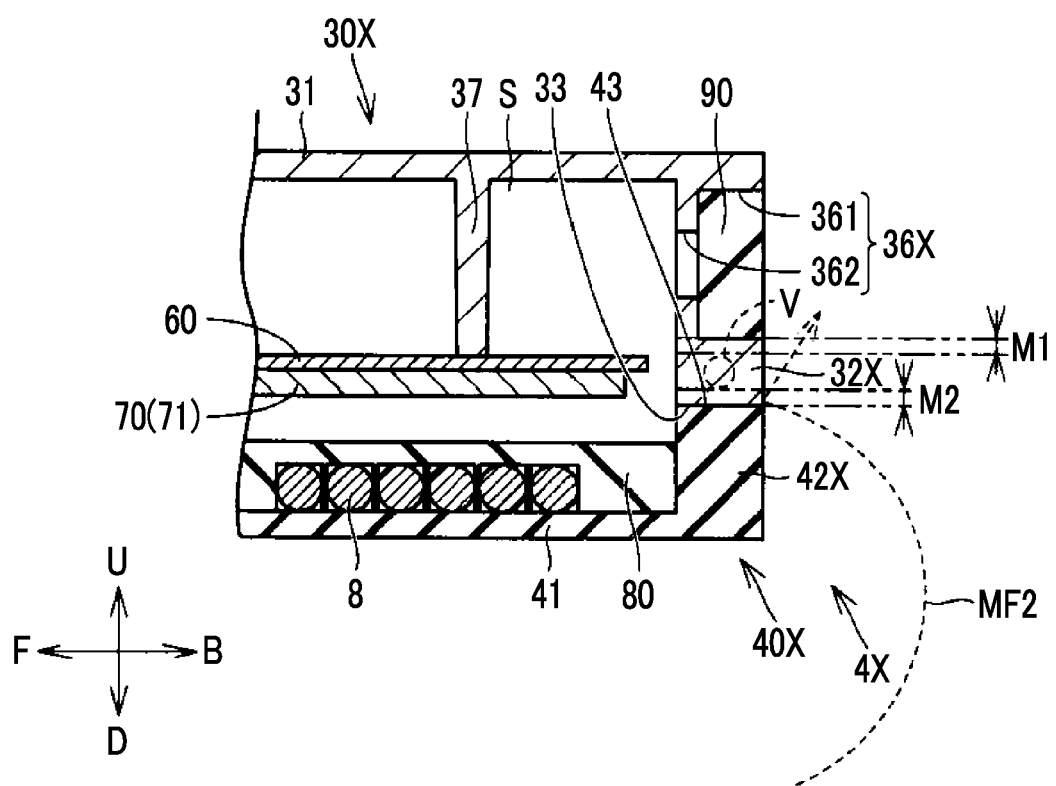
FIG. 5 is a cross-sectional view that shows a structure around a through-hole through which a wiring member passes in a coil unit according to a comparative embodiment.

FIG. 5 is a cross-sectional view that shows a structure around a through-hole through which a wiring member passes in a coil unit according to a comparative embodiment. The coil unit 4X according to the comparative embodiment will be described with reference to FIG. 5.

As shown in FIG. 5, the coil unit 4X according to the comparative embodiment differs from the coil unit 4 according to the embodiment in the configuration of a second case 30X and in that the thickness of a first circumferential wall portion 42X of a first case 40X is reduced. The other configuration is substantially similar to the configuration of the coil unit 4.

The second case 30X includes the second plate portion 31, a second circumferential wall portion 32X, the second joint face 33 and a through-hole 36X. The second case 30X has no protruding portion 35 that is provided in the embodiment.

The second plate portion 31 has a substantially flat plate shape. The second circumferential wall portion 32X is provided so as to be upright from the periphery of the second plate portion 31. The second joint face 33 is provided at the distal end of the second circumferential wall portion 32X in the direction in which the second circumferential wall portion 32X is upright.

The through-hole 36X extends through the second circumferential wall portion 32X. The inner periphery of the second circumferential wall portion 32X, which defines the through-hole 36X, includes the large-diameter portion 361 and the small-diameter portion 362. The large-diameter portion 361 is provided on the side opposite from the side on which the accommodation space S is located. The small-diameter portion 362 connects the large-diameter portion 361 with the accommodation space.

The large-diameter portion 361 is provided at a position that overlaps with the second joint face 33 in the direction in which the first case 40 and the second case 30 face each other.

As in the case of the embodiment, the large-diameter portion 361 and the second joint face 33 are formed by grinding the inner periphery of the second case 30, which defines a hole provided in the second circumferential wall portion 32, and an end face that is located at the distal end of the second circumferential wall portion 32. For this reason, in the comparative embodiment, the case body is ground from both the inner peripheral side and outer peripheral side of the second case 30.

The second case 30 is formed by casting a material that blocks magnetic fluxes, typically, aluminum, an aluminum alloy, or the like. Depending on the condition of casting, a void V can be formed in the second case 30.

If the end face of the second case 30, which defines the second joint face 33, or the inner periphery of the second case 30, which forms the large-diameter portion 361, reaches the void V as a result of grinding, water, or the like, may enter the inside of the first case 40 and second case 30 from the outside through the void V.

For this reason, as shown in FIG. 5, it is required to ensure a margin of the thickness as indicated by, for example, M1, M2 for the void V, and the thickness of the second circumferential wall portion 32X increases to an appreciable extent. Thus, the thickness of the first circumferential wall portion 42X that is mated with the second circumferential wall portion 32X reduces, and all the portion at which the first joint face 43 and the second joint face 33 are joined with each other is located closer to the first plate portion 41 than the position of the ferrite plate 70. That is, all the portion at which the first joint face 43 and the second joint face 33 are joined with each other is located below the position of the principal face of the ferrite plate 70, facing the first plate portion 41.

In this case, the side of the ferrite plate 70, which corresponds to all the portion at which the first joint face 43 and the second joint face 33 are joined with each other, is covered with the second circumferential wall portion 32 that blocks magnetic fluxes. Thus, a magnetic flux MF2 shown in FIG. 5, which corresponds to a magnetic flux MF1 of the embodiment, is reflected by the second circumferential wall portion 32X, and is not input to the ferrite plate 70. As a result, magnetic fluxes that are input to the ferrite plate 70 reduce.

In the above-described embodiment, description is made by illustrating the case where all the portion at which the first joint face 43 and the second joint face 33 are joined with each other is located closer to the second plate portion 31 than the position of the ferrite plate 70 in the direction parallel to the direction in which the first case 40 and the second case 30 face each other; however, the disclosure is not limited to this configuration. At least part of the portion at which the first joint face 43 and the second joint face 33 are joined with each other just needs to be located closer to the second plate portion 31 than the position of the ferrite plate 70 in the direction parallel to the direction in which the first case 40 and the second case 30 face each other.

In this case, the side of the ferrite plate, which corresponds to at least part of the portion at which the first joint face 43 and the second joint face 33 are joined with each other, is covered with not the second circumferential wall portion that blocks magnetic fluxes but the first circumferential wall portion that allows magnetic fluxes to pass therethrough. For this reason, it is possible to input magnetic fluxes, which have passed through the first circumferential wall portion, to the ferrite plate, and it is possible to suppress a reduction in magnetic fluxes that are input to the ferrite plate.

In the above-described embodiment, description is made by illustrating the case where the part 352a of the outer periphery of the second cylindrical portion 352 is located closer to the second plate portion 31 than the position of the ferrite plate 70 in the direction parallel to the direction in which the first case 40 and the second case 30 face each other; however, the disclosure is not limited to this configuration. As long as the second joint face 33 and the part 351a of the outer periphery of the first cylindrical portion 351, which is connected to the second joint face 33, are located closer to the second plate portion 31 than the position of the ferrite plate 70, the part of the outer periphery of the second cylindrical portion 352 may be located closer to the first plate portion 41 than the position of the ferrite plate 70.

The embodiment described above is illustrative and not restrictive in all respects. The scope of the disclosure is defined by the appended claims. The scope of the disclosure is intended to encompass all modifications within the scope of the appended claims and equivalents thereof.

What is claimed is:

1. A coil unit comprising:
a first case and a second case facing each other in a predetermined direction, the first case and the second case defining an accommodation space inside when joined with each other;
a ferrite plate, a coil and a shield member that are arranged in the accommodation space; and
a seal member attached to the second case for taking a wiring member outside from an inside of the accommodation space, the wiring member being electrically connected to the coil, wherein
the first case includes a first plate portion, a first circumferential wall portion provided so as to be upright from a periphery of the first plate portion, and a first joint face located at a distal end of the first circumferential wall portion in a direction in which the first circumferential wall portion is upright, and the first case is configured such that magnetic fluxes pass through the first case,
the second case includes a second plate portion arranged to face the first plate portion, a second circumferential wall portion provided so as to be upright from a periphery of the second plate portion, and a second joint face located at a distal end of the second circumferential wall portion in a direction in which the second circumferential wall portion is upright, and the second case is configured to block magnetic fluxes,
the first case and the second case define the accommodation space when the first joint face and the second joint face are joined with each other,
the ferrite plate is arranged in the accommodation space such that a thickness direction of the ferrite plate is parallel to the predetermined direction,
the coil is arranged between the first plate portion and the ferrite plate such that a winding axis of the coil is parallel to the predetermined direction,
the shield member is arranged between the second plate portion and the ferrite plate so as to support the ferrite plate,
at least part of a portion at which the first joint face and the second joint face are joined with each other is located closer to the second plate portion than a position of the ferrite plate in a direction parallel to the predetermined direction, the second case further includes a protruding portion and a through-hole, the protruding portion protrudes outward from a position of the second circumferential wall portion when viewed in the direction parallel to the predetermined direction, the through-hole extends through the protruding portion and the second circumferential wall portion so as to communicate with the accommodation space, the wiring member and the seal member are arranged inside the through-hole, an inner periphery of the second case, which defines the through-hole, includes a large-diameter portion and a small-diameter portion, the large-diameter portion is provided at an end opposite from a side on which the accommodation space is located and at a position that does not overlap with the second joint face when viewed in the direction parallel to the predetermined direction, the small-diameter portion connects the large-diameter portion with the accommodation space, the small-diameter portion is smaller in inside diameter than the large-diameter portion, and the seal member is arranged inside the large-diameter portion.

2. The coil unit according to claim 1, wherein
all the portion at which the first joint face and the second joint face are joined with each other is located closer to the second plate portion than the position of the ferrite plate in the direction parallel to the predetermined direction.

3. The coil unit according to claim 1, wherein
the protruding portion includes a first cylindrical portion and a second cylindrical portion, the second cylindrical portion is located on an outer side of the first cylindrical portion when viewed in the predetermined direction, the second cylindrical portion is larger in outside diameter than the first cylindrical portion, part of an outer periphery of the first cylindrical portion, which is connected with the second joint face, is flush with the second joint face and is located closer to the second plate portion than part of an outer periphery of the second cylindrical portion, which is connected with the part of the outer periphery of the first cylindrical portion, and the second cylindrical portion has the large-diameter portion inside.

4. The coil unit according to claim 1, wherein
the inner periphery of the second case, which defines the small-diameter portion, has a tapered portion of which a circumference increases from a side of the accommodation space toward an outer side of the second case.

* * * * *